No. 673,351. Patented Apr. 30, 1901.
W. M. AMMERMAN & E. J. TOOF.
CLUTCH MECHANISM FOR SEWING MACHINES.
(Application filed Dec. 31, 1894.)

(No Model.)

Witnesses:

Inventors:

UNITED STATES PATENT OFFICE.

WILLIAM M. AMMERMAN AND EDWIN J. TOOF, OF NEW HAVEN, CONNECTICUT, ASSIGNORS TO SAID TOOF.

CLUTCH MECHANISM FOR SEWING-MACHINES.

SPECIFICATION forming part of Letters Patent No. 673,351, dated April 30, 1901.

Original application filed October 16, 1890, Serial No. 368,353. Divided and this application filed December 31, 1894. Serial No. 533,400. (No model.)

*To all whom it may concern:*

Be it known that we, WILLIAM M. AMMERMAN and EDWIN J. TOOF, citizens of the United States, and residents of the city and county of New Haven, State of Connecticut, have invented new and useful Improvements in Clutch Mechanism for Sewing-Machines, of which the following description, taken in connection with the drawings herewith accompanying, is a specification.

Our present invention, which forms a division of an application of ours now pending, filed October 16, 1890, and bearing Serial No. 368,353, relates to the clutch mechanism for securing connection or disconnection between the pulley and the driving-shaft to either operate the stitching mechanism or the bobbin attachment, respectively, as may be desired; and the invention consists in the construction and combination of the several parts whereby an automatic connection or disconnection may be secured between the pulley and its shaft as the bobbin-winding attachment is moved either from or to an operative position in a manner as will hereinafter be set forth in detail.

Figure 1:
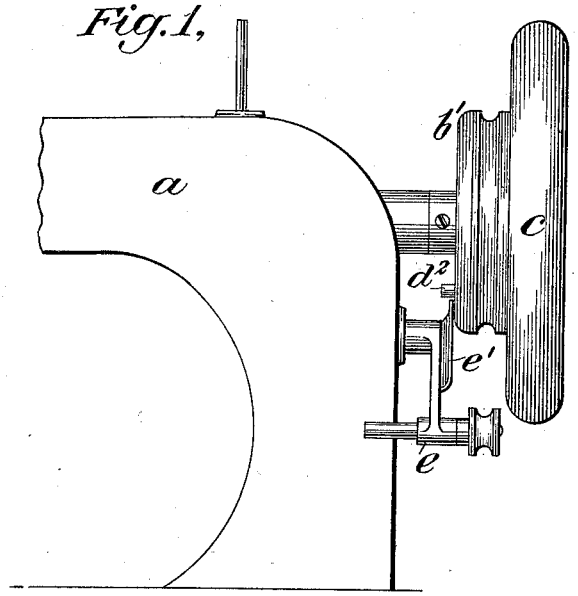
Figure 3:
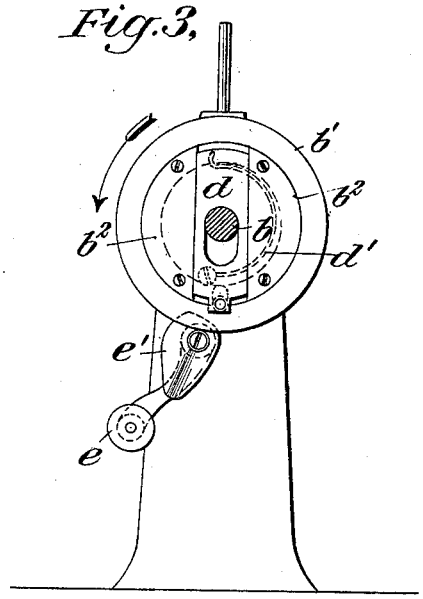
Figure 2:
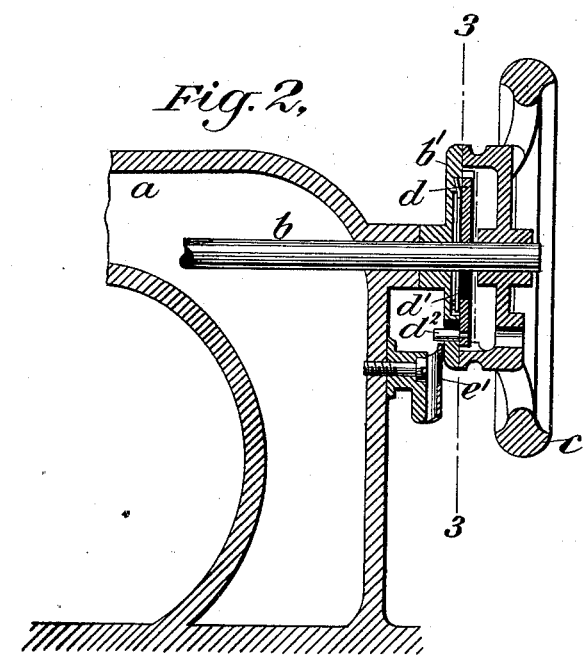
Figure 4:
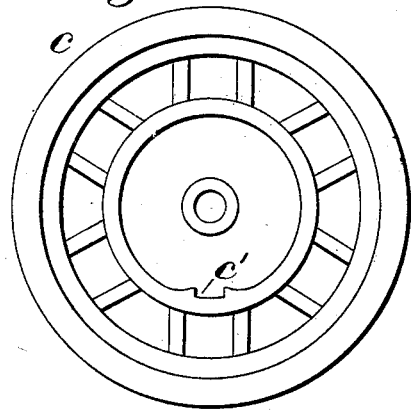

Referring to the accompanying drawings, Figure 1 represents a portion of a sewing-machine arm, with the driving-shaft, pulley, and the bobbin-winding attachment embodying our improved clutch mechanism. Fig. 2 is a vertical section through the center of the construction shown in Fig. 1. Fig. 3 is a sectional view in line 3 3 of Fig. 2. Fig. 4 is a view of the inner face of the pulley detached from its position on the driving-shaft.

To explain in detail, $a$ represents a section of a sewing-machine arm, $b$ the driving-shaft, and $c$ the pulley, the latter being loosely supported upon the driving-shaft in a manner to revolve freely thereon when not connected with the same by our improved clutch mechanism, as will be described.

According to our present invention we have provided the driving-shaft with a plate or collar $b'$, which is movable therewith and constructed to support and carry a sliding bolt $d$. This bolt in the present instance shown is supported or seated on the plate $b'$ between two plates $b^2$ $b^2$ in a manner to be moved or rotated therewith and also be capable of a sliding movement thereon, whereby it may be moved either to or from a position for locking engagement with the pulley $c$ and form connection or disconnection between the latter and the stitching mechanism for the purpose above referred to. The bolt $d$ is adapted to be movably held in a normal position with one end in locking engagement with the pulley $c$ in a seat $c'$ therein by means of a spring $d'$, which is seated in the collar $b'$ at the rear of the bolt, with one end in engagement with the latter, as more clearly shown in Figs. 2 and 3. The bolt $d$ is also provided with an arm or pin $d^2$, which projects therefrom through a slot or opening in the plate $b'$ into a position to be engaged by a flange or part $e'$ of the hinged bobbin-winding attachment $e$ when the latter is moved into an operative position and be raised thereby to move the end of the bolt $d$ from connection with the pulley-wheel and allow the latter to revolve loosely on the driving-shaft.

Having thus described and illustrated our invention as embodied in one practical form, it will be obvious that the arrangement of the several parts as set forth may be modified more or less without departing from the spirit of our invention, one of the essential features of which is a movable bolt arranged to be held in a normal position to connect the pulley and driving-shaft and be moved from or to such position upon the raising or lowering of the bobbin-winding attachment to or from an operative position. A lever or device other and independent of the bobbin-winding attachment may, however, be employed in lieu of the latter for moving the bolt from its locking engagement with the pulley.

Having thus set forth our invention, what we claim as new, and desire to secure by Letters Patent of the United States, is—

1. In a sewing-machine, the combination with the driving-shaft having a loose pulley supported thereon, of a sliding bolt connected with said shaft so as to be rotated thereby and be movable transversely to the axis of the same, the said loose pulley having means for the engagement therewith of said bolt, means for movably holding the bolt in locking engagement with the pulley, and a bobbin-winding attachment pivotally supported upon the frame of the machine having a cam-surface thereon, whereby, when the attachment is swung into an operative position, its said cam-surface will engage with the bolt to disconnect the same from its engagement with the pulley, substantially as and for the purpose set forth.

2. In a sewing-machine, the combination with the driving-shaft provided with a loose pulley thereon, of a collar made fast upon said shaft, and provided with a groove in that side adjacent to the pulley, a bolt supported to slide in said groove, means for movably holding said bolt in locking engagement with the pulley, and a bobbin-winding attachment movably supported upon the frame of the machine having a cam-surface thereon, whereby, when the attachment is moved into an operative position, its said cam-surface will engage with a projecting arm of said bolt and disconnect the latter from its engagement with the pulley, substantially as described and for the purpose set forth.

WILLIAM M. AMMERMAN.
EDWIN J. TOOF.

Witnesses:
CHAS. F. DANE,
A. L. HAYES.